(12) United States Patent
Indurkhya et al.

(10) Patent No.: US 12,086,134 B2
(45) Date of Patent: Sep. 10, 2024

(54) SYSTEMS AND METHODS FOR NATURAL LANGUAGE QUERYING

(71) Applicant: Virtualitics, Inc., Pasadena, CA (US)

(72) Inventors: Sagar Indurkhya, Pasadena, CA (US); Héctor Javier Vázquez Martínez, Pasadena, CA (US); Gennaro Zanfardino, Pasadena, CA (US); Ciro Donalek, Pasadena, CA (US)

(73) Assignee: Virtualitics, Inc., Pasadena, CA (US)

( * ) Notice: Subject to any disclaimer, the term of this patent is extended or adjusted under 35 U.S.C. 154(b) by 0 days.

(21) Appl. No.: 17/660,178

(22) Filed: Apr. 21, 2022

(65) Prior Publication Data
US 2022/0342873 A1   Oct. 27, 2022

Related U.S. Application Data (60) Provisional application No. 63/177,900, filed on Apr. 21, 2021.

(51) Int. Cl.
| G06F 16/00 | (2019.01) |
| G06F 16/22 | (2019.01) |
| G06F 16/242 | (2019.01) |
| G06F 16/2455 | (2019.01) |
| G06F 16/248 | (2019.01) |

(52) U.S. Cl.
CPC ........ *G06F 16/243* (2019.01); *G06F 16/2264* (2019.01); *G06F 16/2455* (2019.01); *G06F 16/248* (2019.01)

(58) Field of Classification Search
None
See application file for complete search history.

(56) References Cited

U.S. PATENT DOCUMENTS

| 10,621,762 | B2   | 4/2020  | Donalek et al. |
| 10,657,125 | B1 * | 5/2020  | Gautam ............ G06F 16/24522 |
| 11,003,426 | B1 * | 5/2021  | Wilson ................ G06F 9/45508 |
| 2009/0222429 | A1 * | 9/2009 | Aizenbud-Reshef ..... G06F 8/36 707/999.005 |
| 2019/0347837 | A1 * | 11/2019 | Donalek ............... G06T 11/206 |
| 2019/0377728 | A1 * | 12/2019 | Cai ........................ G06F 16/248 |

OTHER PUBLICATIONS

Bazaga et al., "Translating synthetic natural language to database queries with a polyglot deep learning framework", Nature, Scientific Reports, vol. 11, No. 18462, 2021, 11 pgs.

(Continued)

*Primary Examiner* — Thu Nguyet T Le
(74) *Attorney, Agent, or Firm* — KPPB LLP (57) ABSTRACT

Systems and methods for natural language querying in accordance with embodiments of the invention are illustrated. One embodiment includes a data visualization system, including a processor, and a memory, the memory including a core grammar library, comprising a list of regular expression-system function pairs, and a natural language query (NLQ) application, where the NLQ application configures the processor to obtain a database from a user, obtain an NLQ directed at the database, parse the NLQ using the core grammar library to identify a system function and a set of one or more parameters, and perform the system function using the set of one or more parameters to visualize at least a portion of the database.

18 Claims, 4 Drawing Sheets

(56) References Cited

OTHER PUBLICATIONS

Danilevsky et al., "A Survey of the State of Explainable AI for Natural Language Processing", arXiv, arXiv:2010.00711v1, Retrieved from: https://arxiv.org/abs/2010.00711, Oct. 1, 2020, 13 pgs.
Dar et al., "Frameworks for Querying Databases Using Natural Language: A Literature Review", arXiv, arXiv: 1909.01822, Retrieved from: https://arxiv.org/abs/1909.01822, Sep. 3, 2019, 18 pgs.
Hariri et al., "Uncertainty in big data analytics: survey, opportunities, and challenges", Journal of Big Data, vol. 6, No. 44, 2019, https://doi.org/10.1186/s40537-019-0206-3, 16 pgs.
Popescu et al., "Towards a Theory of Natural Language Interfaces to Databases", ACM IUI (Intelligent User Interfaces) 2003 Proceedings of the 8th International Conference on Intelligent User Interfaces, Jan. 2003, pp. 149-157.
Wang et al., "Interactive Data Analysis with Next-step Natural Language Query Recommendation", Journal of Latex Class Files, vol. 14, No. 8, Aug. 2015, 14 pgs.
Yaghmazadeh et al., "SQLizer: Query Synthesis from Natural Language", Proceedings of the ACM on Programming Languages, vol. 1, No. OOPSLA, Article 63, Oct. 2017, 26 pgs.

* cited by examiner

SYSTEMS AND METHODS FOR NATURAL LANGUAGE QUERYING

CROSS-REFERENCE TO RELATED APPLICATIONS

The current application claims the benefit of and priority under 35 U.S.C. § 119(e) to U.S. Provisional Patent Application No. 63/177,900 entitled "Systems and Methods for Natural Language Querying" filed Apr. 21, 2021. The disclosure of U.S. Provisional Patent Application No. 63/177,900 is hereby incorporated by reference in its entirety for all purposes.

FIELD OF THE INVENTION

The present invention generally relates to querying databases in natural language (e.g. plain English), and more specifically to enabling the processing of natural language queries at high-dimensional databases.

BACKGROUND

Databases are structured collections of information stored electronically in a computer system. Databases are typically modeled in rows and columns, where each column (or "dimension") reflects an attribute, and where each row (or "record") reflects one entry with values for each attribute. Databases are typically queried in a structured way, for example using the Structured Query Language (SQL).

Natural language processing (NLP) is a field at the intersection of linguistics and computer science that is concerned with how to enable computers to understand human language.

SUMMARY OF THE INVENTION

Systems and methods for natural language querying in accordance with embodiments of the invention are illustrated. One embodiment includes a data visualization system, including a processor, and a memory, the memory including a core grammar library, comprising a list of regular expression-system function pairs, and a natural language query (NLQ) application, where the NLQ application configures the processor to obtain a database from a user, obtain an NLQ directed at the database, parse the NLQ using the core grammar library to identify a system function and a set of one or more parameters, and perform the system function using the set of one or more parameters to visualize at least a portion of the database.

In another embodiment, the NLQ application further configures the processor to generate a plurality of suggested NLQs based on a statistical analysis of the database.

In a further embodiment, the statistical analysis comprises generating a Pearson's correlation coefficient (PCC) matrix, and to generate the plurality of suggested NLQs, the NLQ application further configures the processor to generate suggested NLQs that result in the visualization of a dimension of the database most highly correlated with all other dimensions of the database using the PCC matrix.

In still another embodiment, the statistical analysis includes calculating Shannon Entropy for each dimension of the database.

In a still further embodiment, a suggested NLQ in the plurality of suggested NLQs is an NLQ which performs a smart mapping.

In yet another embodiment, the obtained NLQ comprises a suffix-operator, and the NLQ application further configures the processor to perform the suggested NLQ in the plurality of suggested NLQs that most closely resembles the obtained NLQ.

In a yet further embodiment, the memory further contains an extended grammar library comprising a second list of regular expression-system function pairs that are domain-specific to the database, where the extended grammar library is used with the core grammar library to parse the obtained NLQ.

In another additional embodiment, the NLQ application further directs the processor to determine if the obtained NLQ is fully parametrized, and request correction if the obtained NLQ is not fully parameterized.

In yet another additional embodiment, in response to an inability to parse the NLQ, the NLQ application further configures the processor to identify key words in the NLQ if it is not able to be parsed using the core grammar library, generate a plurality of suggested queries based on the key words, provide the suggested queries, receive a selection of one of the suggested queries, resolve unspecified parameters if present in the selected suggested query, and execute the selected suggested query.

In a further additional embodiment, a method for natural language querying a data visualization system, including obtaining a database from a user, obtaining a natural language query (NLQ) directed at the database, parsing the NLQ using a core grammar library to identify a system function and a set of one or more parameters, where the core grammar library includes a list of regular expression-system function pairs, and performing the system function using the set of one or more parameters to visualize at least a portion of the database.

In another embodiment again, the method further includes generating a plurality of suggested NLQs based on a statistical analysis of the database.

In a further embodiment again, the statistical analysis includes generating a Pearson's correlation coefficient (PCC) matrix, and generating the plurality of suggested NLQs includes generating suggested NLQs that result in the visualization of a dimension of the database most highly correlated with all other dimensions of the database using the PCC matrix.

In still yet another embodiment, the statistical analysis includes calculating Shannon Entropy for each dimension of the database.

In a still yet further embodiment, a suggested NLQ in the plurality of suggested NLQs is an NLQ which performs a smart mapping.

In still another additional embodiment, the obtained NLQ includes a suffix-operator, and the method further includes performing the suggested NLQ in the plurality of suggested NLQs that most closely resembles the obtained NLQ.

In a still further additional embodiment, the memory further includes an extended grammar library includes a second list of regular expression-system function pairs that are domain-specific to the database, where the extended grammar library is used with the core grammar library to parse the obtained NLQ.

In still another embodiment again, the method further includes determining if the obtained NLQ is fully parametrized, and requesting correction if the obtained NLQ is not fully parameterized.

In a still further embodiment again, in response to an inability to parse the NLQ, the method further includes identifying key words in the NLQ if it is not able to be parsed using the core grammar library, generating a plurality of suggested queries based on the key words, providing the suggested queries, receiving a selection of one of the suggested queries, resolving unspecified parameters if present in the selected suggested query, and executing the selected suggested query.

In a yet further additional embodiment, a natural language query enabled database visualization system, including a processor, and a memory, the memory including a core grammar library including a list of regular expression-system function pairs, and a natural language query (NLQ) application, where the NLQ application configures the processor to receive an NLQ, identify key words in the NLQ if it is not able to be parsed using the core grammar library, generate a plurality of suggested queries based on the key words, provide the suggested queries, receive a selection of one of the suggested queries, resolve unspecified parameters if present in the selected suggested query, and execute the selected suggested query.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Turning now to the drawings, systems and methods for natural language querying are described. A natural language query (NLQ) is a query that is made up of only normal terms in the user's language. The purpose of NLQs is to make data access more approachable and fluid for non-technical (and often technical) users. In contrast to using a structured, well-defined query format such as (but not limited to) the Structured Query Language (SQL) which many database management systems use, NLQs are significantly more difficult for a computer to interpret. Natural language lends itself to having ambiguity which structured languages seek to disallow by design. With large datasets having a high dimensionality (e.g. having many columns, in a tabular database), the risk of ambiguity increases. As such, it is desirable for NLQ-capable systems to be able to resolve ambiguous queries for a user. Systems and methods described herein enable context-aware resolution of ambiguous NLQs.

In numerous embodiments, systems and methods described herein are capable of resolving queries to a database and visualizing the results. In many embodiments, systems and methods described herein enable context-aware, predictive queries based on incomplete NLQs obtained from a user. A core grammar library containing common commands and expressions can be used to parse many NLQs. The core grammar library can be supplemented with extended grammar libraries that can be user-generated to enable additional flexibility for specific data sets. System architectures for NLQ-enabled database visualization systems are discussed below.

NLQ-Enabled Database Visualization System

Database visualization systems as described herein are computer systems which are capable of ingesting large datasets and producing multi-dimensional renderings of the dataset. In many embodiments, database visualization systems have some or all of the functionality of a database management system. In various embodiments, the database visualization system is capable of ingesting a database and querying it similar to a database management system, but may not necessarily provide additional database management tools. Data visualization systems such as those discussed below are further described in U.S. Pat. No. 10,621,762 titled "Systems and Methods for High Dimensional 3D Data Visualization" filed Sep. 17, 2018, the disclosure of which is hereby incorporated by reference in its entirety. Database visualization systems can be modified to enable NLQ-based visualization of ingested datasets. In numerous embodiments, NLQ-enabled database visualization systems are implemented on one or more computing platforms. In some embodiments, a single computing platform is used; however remote servers can be used to provide a cloud system architecture.

Figure 1:
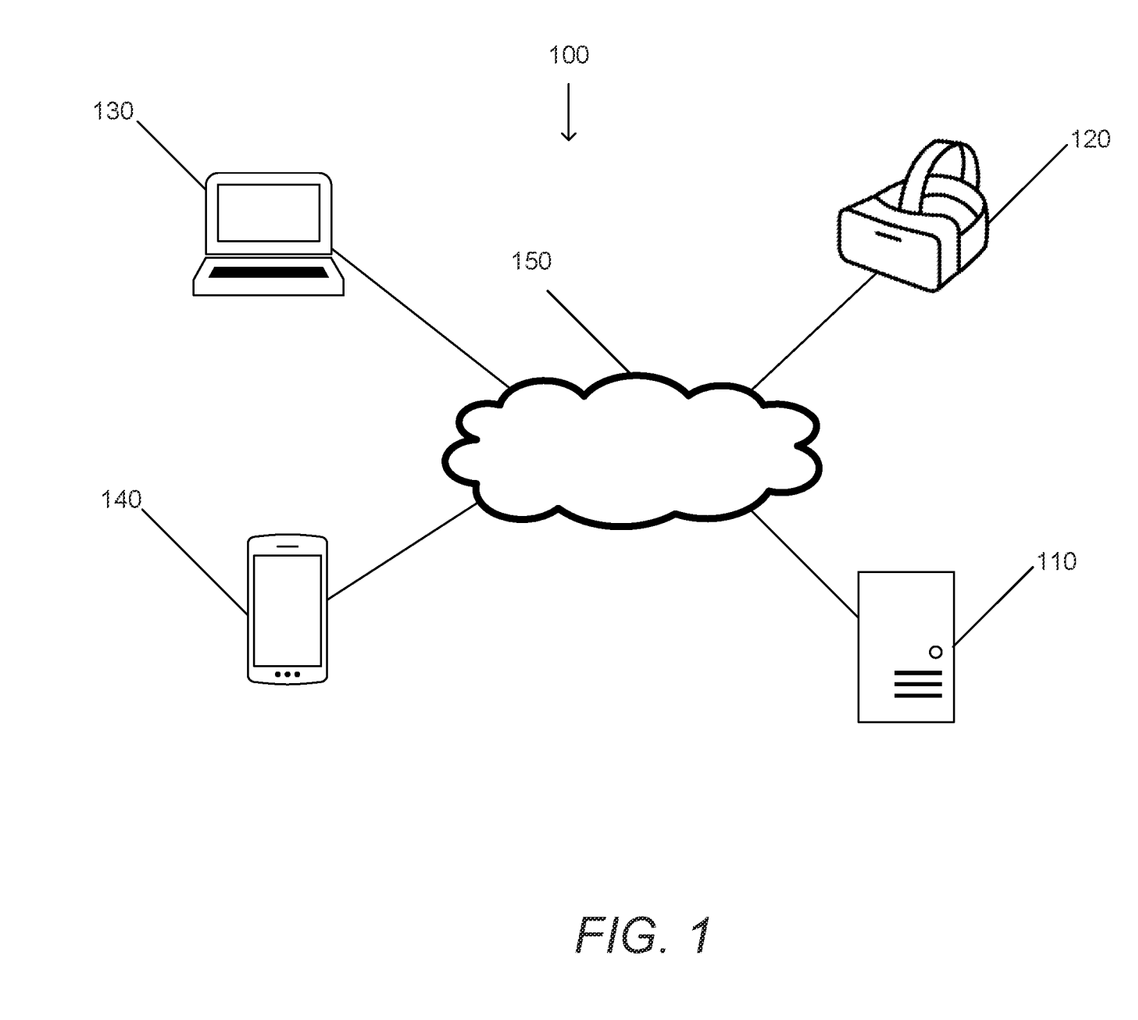
FIG. 1 illustrates a natural language query enabled database visualization system in accordance with an embodiment of the invention.

Turning now to FIG. 1, an NLQ-enabled database visualization system in accordance with an embodiment of the invention is illustrated. A data visualization system in accordance with an embodiment of the invention is illustrated in FIG. 1. NLQ-enabled database visualization system 100 includes a data visualization server 110. As noted above, data visualization servers can be implemented using a variety of different hardware. For example, personal computers, servers, server systems (e.g. cloud computing architectures), and/or any other computing device could be used as a data visualization computer system. In numerous embodiments, data visualization computer systems can leverage distributed computer hardware. Data visualization servers can accept NLQs and provide appropriate output via NLQ methods described in further sections below.

NLQ-enabled database visualization system 100 further includes a number of user interface devices, such as a VR display 120, a computer terminal 130, and smartphone 140. Example VR displays can be, but are not limited to, VR headsets such as the Oculus Rift, HTC Vive, or the Google Cardboard, AR displays such as the Microsoft Hololens, and/or MR displays such as Windows Mixed Reality Headsets. In many embodiments, user interface devices include a display capable of rendering high dimensional data in accordance with data visualization processes. In a variety of embodiments, user interface devices enable users to set visualization parameters, manipulate the view point of the visualization, and/or access generated insights. NLQ-enabled data visualization systems can provide different viewpoints of the same visualization to each connected user interface device, and/or provide the same viewpoint to two or more user interface devices. However, in numerous embodiments, conventional displays such as desktop monitors can be used to display data in a virtual office and/or for a single user as appropriate to the requirements of specific applications of embodiments of the invention.

Data visualization server 110 is connected to interface devices via a network 150. Network 150 can be a wired network, a wireless network, and/or a mixed medium network. Example network implementations and frameworks include, but are not limited to, wide area networks, local area networks, personal area networks, the Internet, Bluetooth, or any other communication protocol and/or network architecture as appropriate to the requirements of a given application. As can be readily appreciated, and number of architectures can be used, such as, but not limited to, architectures that involved distributed computing platforms, different numbers of user interface devices, and/or any other implementation that may be appropriate to the requirements of a given application.

Figure 2:
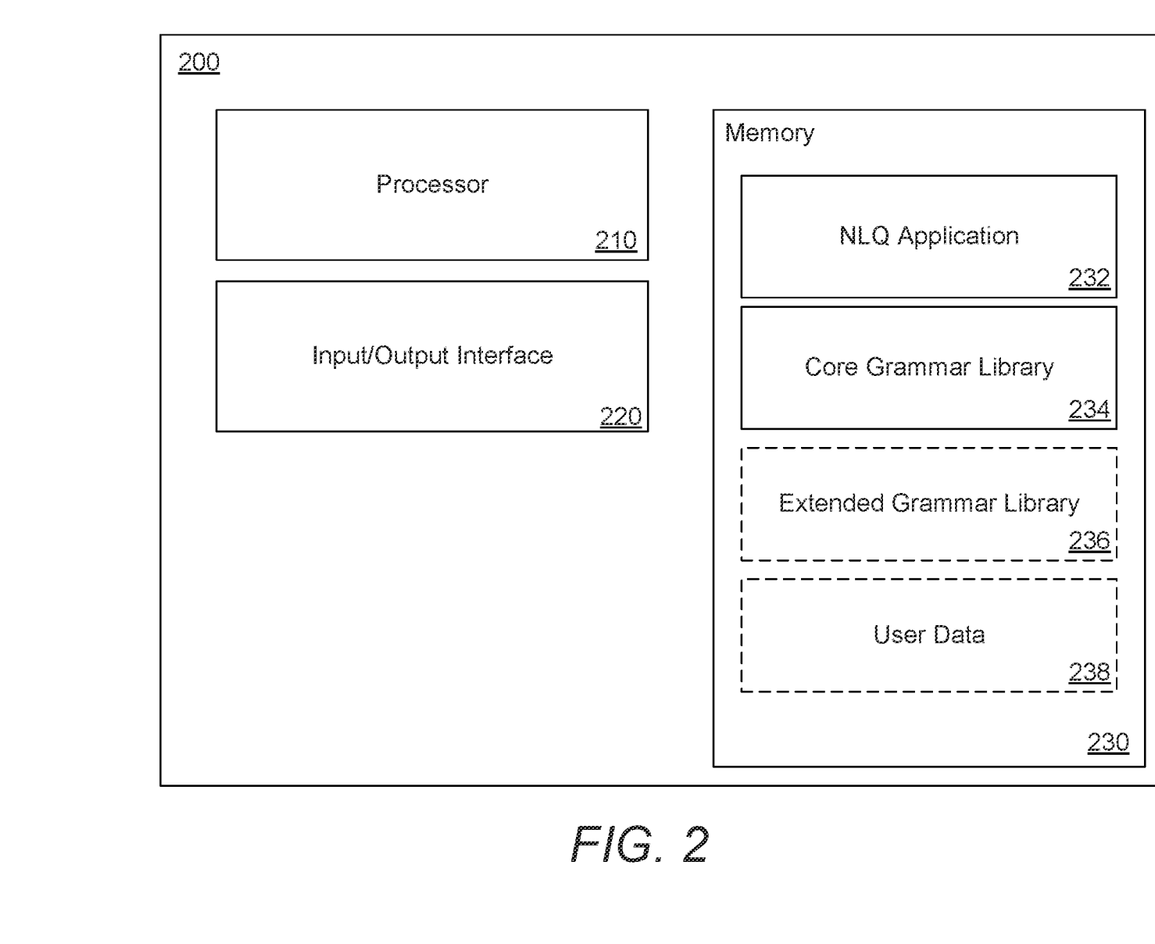
FIG. 2 is a block diagram for a natural language querying device in accordance with an embodiment of the invention.

Turning now to FIG. 2, data visualization server in accordance with an embodiment of the invention is illustrated. Data visualization server 200 includes a processor 210. Processor 210 can be implemented using any number of different logic processing circuities, including (but not limited to) central processing units (CPUs), graphics processing units (GPUs), application-specific integrated circuits (ASICs), field-programmable gate arrays (FPGAs), and/or any other logic processing circuit and/or combination thereof as appropriate to the requirements of specific applications of embodiments of the invention. Data visualization server 200 further includes an input/output (I/O) interface 220. The I/O interface can be used to communicate with input devices, display devices, and/or other computing platforms. The data visualization server 200 further includes a memory 230. The memory can be made of volatile memory, non-volatile memory, and/or any combination thereof. The memory contains an NLQ application 232 which can configure the processor to perform various NLQ processes described herein.

The memory 230 further contains a core grammar library, which is data describing a finite set of named regular expressions, each of which is associate with a functionality of the system. For example, in some embodiments, each function offered by the NLQ-enabled database visualization system can be associated with at least one regular expression. Example functions can include (but are not limited to) visualization options (e.g. scatterplots, histograms, violin plots, line plots, 2D geospatial plots, 3D geospatial plots, etc.); machine learning routines (e.g. smart-mapping, network extraction, anomaly detection, principal component analysis, k-means clustering, etc.), dataset filtering, dataset searching, network extraction, and/or any other function as appropriate to the requirements of specific applications of embodiments of the invention. Core grammar libraries are discussed in further detail in below sections.

In numerous embodiments, the memory 230 can include an extended grammar library 236 having additional regular expressions provided by a user tailored for their specific data. In various embodiments, at different times the memory 230 may have the user data 238 (e.g. the database) loaded into it for processing. As can be readily appreciated the memory may hold other data and/or applications as appropriate to the requirements of specific applications of embodiments of the invention. Further, while particular architectures are illustrated in FIGS. 1 and 2, any number of different computing architectures can be used without departing from the scope or spirit of the invention. NLQ processes are discussed below.

Natural Language Querying Processes

NLQs can be highly variable and unstructured depending on the desires and technical proficiency of the user. Systems and methods described herein can attempt to streamline operation in a number of ways including (but not limited to) providing context-aware suggested NLQs, parsing NLQs with an extensible, dataset specific grammar, and/or providing default queries. In numerous embodiments, context aware suggested NLQs (also referred to as "AI-guided recommendations") are generated by analyzing the statistical properties of a loaded database, and using said properties to predict which actions the user is most likely to take in order to better understand the data. For example, in numerous embodiments, queries which reflect the best visualization to explain a highly significant dimension of the data may be automatically generated and presented to a user.

In many embodiments, when a database is loaded, statistical analyses are run. The statistical analyses can include (but are not limited to) the following: generating a Pearson's Correlation Coefficient (PCC) matrix by calculating PCC between all pairs of numeric dimensions and assembling the PCC values into a square matrix whose diagonal is 1.0, representing the PCC of each column itself; calculating Shannon Entropy of each dimension in the dataset and determining the amount of disorder in each dimension ranging from 0 (all values in the column are equal) to 1 (all values in the column are unique); identifying dimensions that contain latitude and/or longitude information; performing linear regression using numeric dimensions as target variables and autocorrelation analysis on date-time dimensions in order to identify time-series; and/or any other statistical analysis as appropriate to the requirements of specific applications of embodiments of the invention. As can readily be appreciated, any number of analyses can be run depending on the needs of the user and the types of data that they typically investigate. The results of these statistical analyses can be used to inform suggested queries.

By providing high-quality suggested NLQs, ambiguous NLQs provided by a user can be sidestepped. Before a user begins to enter an NLQ, in various embodiments suggested queries can be automatically populated to a search bar. For example, in a variety of embodiments, the above referenced analyses can be used to suggest queries that involve the dimension most highly correlated with all other dimension in the dataset using the PCC matrix. This can be achieved by summing the absolute values of each entry across rows of the matrix such that the result is a column vector of positive integers where each entry corresponds to one of the numeric columns originally used to construct the PCC matrix. Columns with the highest row sum (i.e. highest aggregate correlation with the other columns) can be used to generate suggested queries. In some embodiments, the generated suggested queries yield the output of a smart mapping process with the column with the highest row sum as the target. Smart mapping is discussed in U.S. Pat. No. 10,621, 762, incorporated by reference above.

By way of further example, in numerous embodiments, a network extraction process can be run which yields the most insightful results when the dimension chosen as the target has a high amount of unique values to use as the nodes of the network. As such, a suggested default queries can be generated by looking for dimensions in the dataset whose computed Shannon Entropy is as close as possible to the maximum value of 1. As can be readily appreciated, there are many ways to generate default suggested queries that can be tailored based on what types of data are typically loaded.

Suggested queries do not necessarily need only to arise before the user begins to enter their NLQ. In numerous embodiments, as the user inputs text, context-dependent NLQs can be suggested. In many embodiments, these context-dependent NLQs may also be derived based on visualizations currently presented to the user. By way of example, if the user is viewing a network graph, a suggested context-dependent query may include a smart mapping with Louvain Communities as the target and categorical dimensions of the dataset as associative features, or a clustering using the numerical columns of the dataset may be suggested. Text input by the user can be considered by parsing it using grammar libraries as discussed herein. When possible, query commands are detected, one or more suggestions using the command. If a dimension is called out by the user, the PCC matrix can be used to infer whether more dimensions should be added to the resulting visualization.

Figure 3:
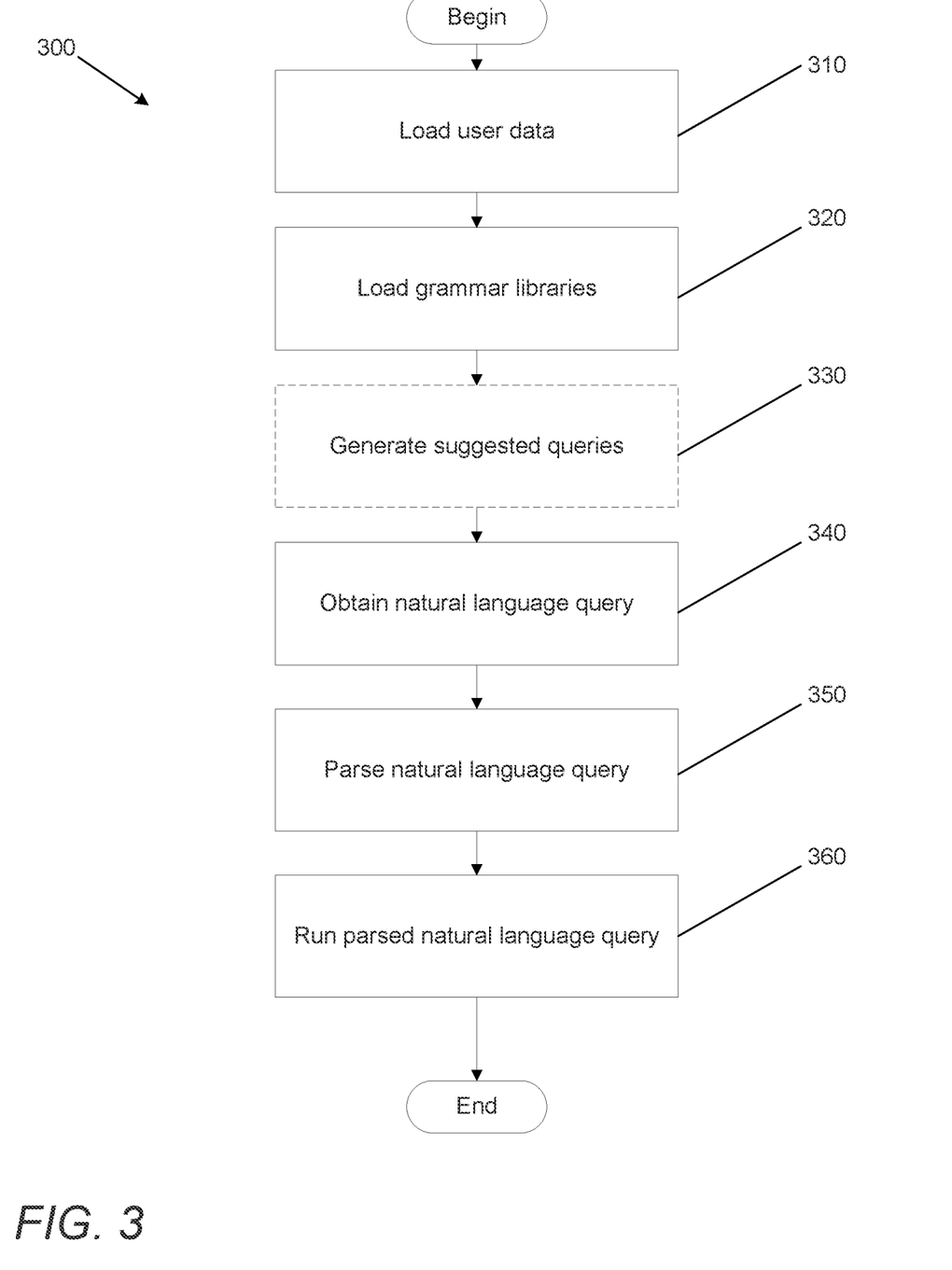
FIG. 3 is a flow chart for a natural language querying process in accordance with an embodiment of the invention.

Turning now to FIG. 3, a flow chart for an NLQ process in accordance with an embodiment of the invention is illustrated. Process 300 includes loading (310) user data and loading (320) grammar libraries. In numerous embodiments a core grammar library is loaded. In various embodiments, extended grammar libraries are also loaded. Suggested queries can be generated (330) based on the type of data that was loaded. These suggested queries can be presented to the user before they begin typing in their own query. An NLQ is obtained (340) from a user, which is parsed (350) using the grammar libraries. Once parsed, the parsed NLQ is run (360) in the system to produce the requested results.

Figure 4:
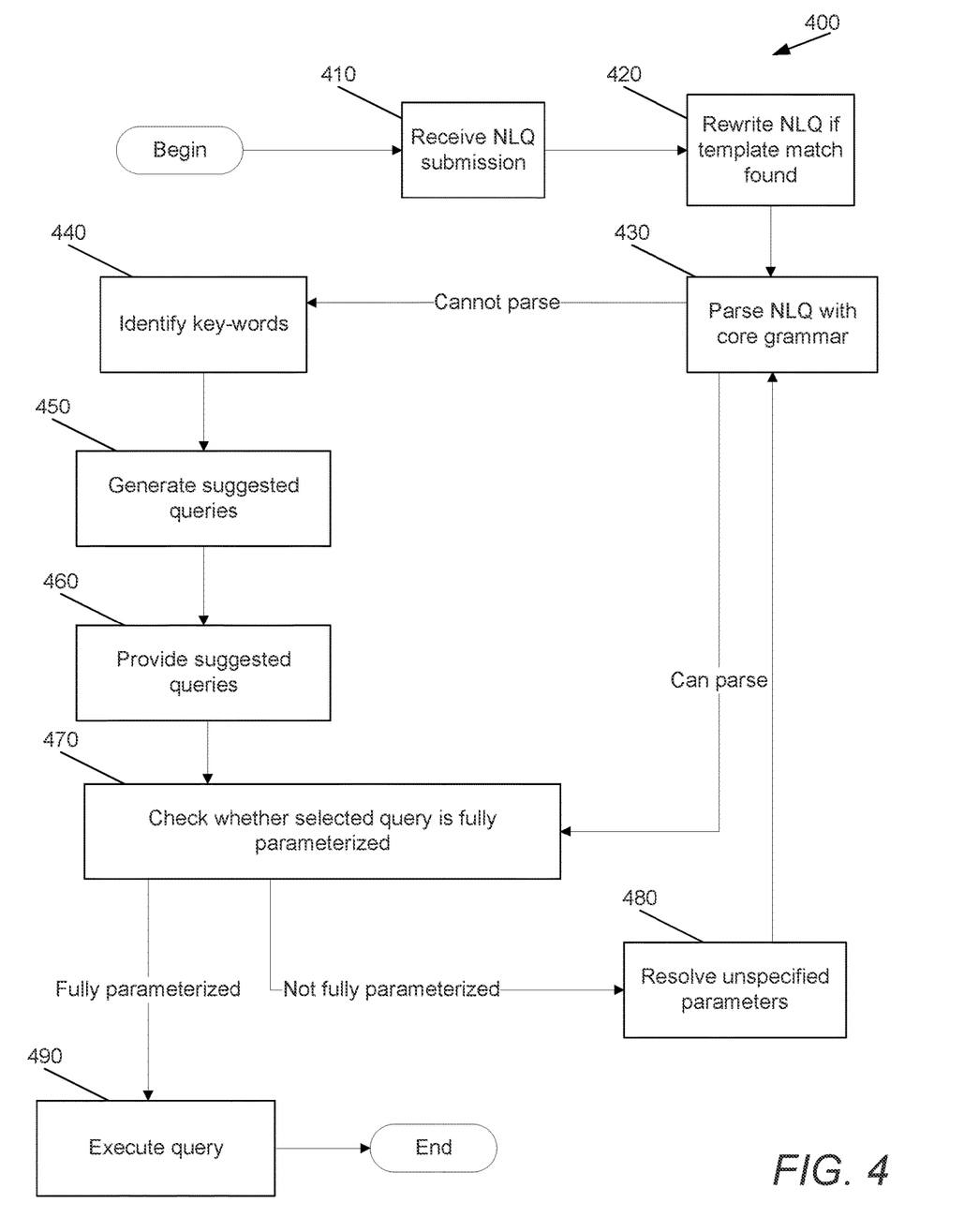
FIG. 4 is a flow chart for another natural language querying process in accordance with an embodiment of the invention.

Turning now to FIG. 4, another NLQ process in accordance with an embodiment of the invention is illustrated. Process 400 includes receiving (410) an NLQ submission. In various embodiments, the NLQ is obtained in real-time as the user types it in, and therefore there can be access to partial NLQs. If an immediate template match is found, the NLQ can be rewritten (420) using the template. If no immediate exact match is found, the grammar libraries are used to parse (430) the NLQ. If the NLQ cannot be parsed, then key-words are identified (440) in the NLQ. Suggested queries are generated (450) and provided (460) to the user. Once one of the suggested queries is selected by the user, a check is performed (470) to determine whether the selected query is fully parameterized. Similarly, if the NLQ was able to be parsed with the grammar library, then that parsed NLQ can be checked (470) to determine if it is fully parameterized. If the query is not fully parameterized, unspecified parameters can be resolved (480) (through automated inference and/or via requesting additional user input). If the command is fully parameterized, then the NLQ can be executed (490) and the results provided to the user. As can be readily appreciated, while different processes are illustrated in FIGS. 3 and 4, any number of different modifications can be made to either process including the addition or removal of steps without departing from the scope or spirit of the invention. As noted, underlying the detection of user NLQ text are grammar libraries which are discussed in detail in the following section.

Grammar Libraries

When NLQs are provided by a user, they can be parsed using core and extended grammar libraries. In numerous embodiments, the core grammar library represents a base set of common commands to access some or all system functions. The extended grammar library is a user-editable extension to the core grammar which can be made to fit their specific needs. In numerous embodiments, grammar libraries are made of named regular expressions. Each regular expression can be tied to a particular command and/or function of the system. The regular expressions themselves can be used to parse supplied NLQs (or parts thereof) to form a structural representation of relevant semantics. In various embodiments, the structural representation is in the form of API commands to the system. In various embodiments, when a user submits an NLQ, the system attempts to parse the query using each regular expression in the library in sequence and stops as soon as a valid phrase has been identified (i.e. the system identifies a regular expression that successfully passed the NLQ).

When a particular regular expression is found to parse the NLQ, relevant semantics can be extracted by recovering the matched name groups in each regular expression. In various embodiments, not all named groups in the regular expression are required to match; for example, when the system is able to successfully parse an NLQ using a regular expression, commands specific to that regular expression can be used to supply default semantic interpretations for each named group if that named group has not been provided by the user. In this way, the user can write queries that are either very specific in how they should be interpreted (corresponding to all semantic roles being supplied) or ambiguous (most semantic roles not supplied).

In various embodiments, when extracting the semantic representation of a successfully parsed query, if the semantic representation is found to be illegitimate (e.g. a categorical feature is supplied instead of a numerical feature for an operation which requires numerical features), the particular named group associated with the illegitimate aspect of the semantic representation and use that information to inform the user as to the error and how to fix it. In many embodiments, a "suffix-operator" can be used that when entered at the end of the NLQ will instruct the system to use the first suggested query if the NLQ cannot be parsed. The suffix-operator can be any character or string of characters desired. Typically, the character or string chosen is a symbol that is unlikely to appear in most queries such as, but not limited to "!". As can readily be appreciated, the suffix-operator can be any arbitrary symbol or specific set of symbols. This enables users to extend the syntax of the grammar using extended grammar libraries while also enabling interpretation of NLQs to be contextually aware of the user's dataset. The same sequence of commands which use the suffix-operator may have different outputs depending on the context of the loaded dataset.

Although specific systems and methods for natural language querying are described herein, many different architectures and/or methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A data visualization system, comprising:
a processor; and a memory, the memory comprising: a core grammar library, comprising a list of regular expression—system function pairs, wherein:
each regular expression—system function pair comprises a regular expression and a system function; and the system function is associated with a set of one or more parameters and can be performed on a database; and a natural language query (NLQ) application; where the NLQ application configures the processor to: obtain a database;

generate a Pearson's correlation coefficient (PCC) matrix from the obtained database by calculating a correlation coefficient between all pairs of numeric dimensions and assembling the correlation coefficient values into a square matrix;

generate a plurality of suggested NLQs such that suggested NLQs that involve a dimension of the obtained database most highly correlated with all other dimensions of the obtained database, wherein generating the suggested NLQs based on the PCC matrix;

present the plurality of suggested NLQs to a user;

obtain an NLQ directed at the obtained database from the user;

parse the obtained NLQ using the core grammar library to identify the system function of a regular expression—system function pair of the list of regular expression—system function pairs and the set of one or more parameters associated with the system function; and perform the identified system function using the set of one or more parameters to visualize at least a portion of the obtained database.

2. The system of claim 1, wherein the statistical analysis comprises calculating Shannon Entropy for each dimension of the obtained database.

3. The system of claim 1, wherein a suggested NLQ in the plurality of suggested NLQs performs a smart mapping.

4. The system of claim 1, wherein: the NLQ application further configures the processor to obtain an initial NLQ; the initial NLQ comprises a suffix-operator; and the obtained NLQ is the suggested NLQ in the plurality of suggested NLQs that most closely resembles the initial NLQ.

5. The system of claim 1, wherein the memory further contains an extended grammar library comprising a second list of regular expression—system function pairs that are domain-specific to the obtained database, where the extended grammar library is used with the core grammar library to parse the obtained NLQ.

6. The system of claim 1, wherein the NLQ application further directs the processor to:

determine if the obtained NLQ is fully parameterized; and request correction if the obtained NLQ is not fully parameterized.

7. The system of claim 1, where:

the NLQ application further configures the processor to:

obtain an initial NLQ;

in response to an inability to parse the initial NLQ, identify key words in the initial NLQ if it is not able to be parsed using the core grammar library; and generate a plurality of suggested NLQs based on the key words; and the NLQ application configures the processor to obtain an NLQ by further configuring the processor to:

provide the suggested NLQs;

receive a selection of one of the suggested NLQs; and resolve unspecified parameters if present in the selected suggested NLQ.

8. The system of claim 1, wherein the obtained NLQ directed at the database is selected from the plurality of suggested NLQs.

9. The system of claim 1, wherein the NLQ application further configures the processor to visualize the at least a portion of the database in a three-dimensional virtual environment.

10. A method for natural language querying a data visualization system, comprising:

obtaining a database;

generating a Pearson's correlation coefficient (PCC) matrix from the obtained database by calculating a correlation coefficient between all pairs of numeric dimensions and assembling the correlation coefficient values into a square matrix;

generating a plurality of suggested NLQs such that suggested NLQs that involve a dimension of the obtained database most highly correlated with all other dimensions of the obtained database, wherein generating the suggested NLQs based on the PCC matrix;

presenting the plurality of suggested NLQs to a user via a display;

obtaining a natural language query (NLQ) directed at the obtained database from the user;

parsing the obtained NLQ using a core grammar library to identify a system function and a set of one or more parameters, where:

the core grammar library comprises a list of regular expression—system function pairs; and the system function is associated with the set of one or more parameters and can be performed on a database;

performing the identified system function using the set of one or more parameters to visualize at least a portion of the obtained database using the display.

11. The method of claim 10, wherein the statistical analysis comprises calculating Shannon Entropy for each dimension of the obtained database.

12. The method of claim 10, wherein a suggested NLQ in the plurality of suggested NLQs performs a smart mapping.

13. The method of claim 10, wherein: the method further comprises obtaining an initial NLQ; the initial NLQ comprises a suffix-operator; and the obtained NLQ is the suggested NLQ in the plurality of suggested NLQs that most closely resembles the initial NLQ.

14. The method of claim 10, further comprising using an extended grammar library with the core grammar library to parse the obtained NLQ, where the extended grammar library comprises a second list of regular expression—system function pairs that are domain-specific to the obtained database.

15. The method of claim 10, further comprising:

determining if the obtained NLQ is fully parameterized; and requesting correction if the obtained NLQ is not fully parameterized.

16. The method of claim 10, where:

the method further comprises:

obtaining an initial NLQ;

in response to an inability to parse the NLQ, identifying key words in the initial NLQ if it is not able to be parsed using the core grammar library; and generating a plurality of suggested NLQs based on the key words; and obtaining an NLQ further comprises:

providing the suggested NLQs;

receiving a selection of one of the suggested NLQs; and resolving unspecified parameters if present in the selected suggested NLQ.

17. The method of claim 10, wherein the obtained NLQ directed at the database is selected from the plurality of suggested NLQs.

18. The method of claim 10, wherein the NLQ application further configures the processor to visualize the at least a portion of the database in a three-dimensional virtual environment.

* * * * *